United States Patent
Kim et al.

(10) Patent No.: US 8,710,706 B2
(45) Date of Patent: Apr. 29, 2014

(54) MOTOR DEVICE AND METHOD OF MANUFACTURING THE SAME

(75) Inventors: Pyo Kim, Gyunggi-do (KR); Nam Seok Kim, Gyunggi-do (KR); Chang Keun Jun, Gyunggi-do (KR)

(73) Assignee: Samsung Electro-Mechanics Co., Ltd., Suwon-Si (KR)

( * ) Notice: Subject to any disclaimer, the term of this patent is extended or adjusted under 35 U.S.C. 154(b) by 268 days.

(21) Appl. No.: 12/926,741

(22) Filed: Dec. 7, 2010

(65) Prior Publication Data

US 2011/0156524 A1 Jun. 30, 2011

(30) Foreign Application Priority Data

Dec. 28, 2009 (KR) ................. 10-2009-0132233

(51) Int. Cl.
*H02K 7/08* (2006.01)
(52) U.S. Cl.
USPC .............................................. 310/90; 310/91
(58) Field of Classification Search
USPC ................. 310/90, 91; 384/100, 101
See application file for complete search history.

(56) References Cited

U.S. PATENT DOCUMENTS

| | | | | |
|---|---|---|---|---|
| 5,173,628 A * | 12/1992 | Yoshida et al. | | 310/71 |
| 6,225,722 B1 * | 5/2001 | Rupp et al. | | 310/91 |
| 6,911,755 B2 * | 6/2005 | Lee et al. | | 310/91 |
| 2006/0091761 A1 * | 5/2006 | Lafontaine et al. | | 310/261 |
| 2006/0113854 A1 * | 6/2006 | Kadowaki et al. | | 310/90 |

FOREIGN PATENT DOCUMENTS

| | | |
|---|---|---|
| JP | 2004-104915 | 4/2004 |
| KR | 10-2007-0007518 | 1/2007 |

* cited by examiner

*Primary Examiner* — Nguyen N Hanh

(57) ABSTRACT

There is provided a motor device. A motor device according to an aspect of the invention may include: a stator including a core having a coil wound therearound; a rotor having a magnet facing the core to thereby generate an electromagnetic force involved in interactions therebetween, the rotor rotating a shaft; a sleeve supporting the shaft; and a sleeve housing having a mounting surface to support the core and a protrusion protruding from the mounting surface to prevent a rotation of the core.

3 Claims, 5 Drawing Sheets

MOTOR DEVICE AND METHOD OF MANUFACTURING THE SAME

CROSS-REFERENCE TO RELATED APPLICATIONS

This application claims the priority of Korean Patent Application No. 10-2009-0132233 filed on Dec. 28, 2009, in the Korean Intellectual Property Office, the disclosure of which is incorporated herein by reference.

BACKGROUND OF THE INVENTION

1. Field of the Invention

The present invention relates to a motor device and a method of manufacturing the same, and more particularly, to a motor device enhancing economic efficiency by reducing the number of components used therein and a method of manufacturing the same.

2. Description of the Related Art

In general, a spindle motor, installed inside an optical disc drive, rotates a disk so that an optical pickup can read data recorded on the disk.

Small, lightweight, and thin hard disk drivers are now required. In particular, as for ultra-thin, slim spindle motors, used in laptop computers, magnetic circuits have also been reduced in size. Thus, various designs thereof have been developed in order to generate torque high enough to rotate an optical disc and ensure a stable rotation of the optical disc.

A motor device may include a shaft supporting a rotary body while the rotary body is rotating, a sleeve receiving the shaft therein, and a holder fixing these components to the inside thereof.

Here, cores may be mounted on the upper side of the holder such that the cores face a magnet in order to generate an electromagnetic force. Here, however, the cores may also be rotated by a rotary force exerted by the generated electromagnetic force.

Furthermore, since a motor device is manufactured by assembling a plurality of components, a large number of components make it difficult to manufacture a motor device and serve to increase manufacturing costs. Therefore, there is a need for techniques to solve these problems.

SUMMARY OF THE INVENTION

An aspect of the present invention provides a motor device that can reduce the number of components used therein and prevent a rotation of a core and a method of manufacturing the same.

According to an aspect of the present invention, there is provided a motor device including: a stator including a core having a coil wound therearound; a rotor having a magnet facing the core to thereby generate an electromagnetic force involved in interactions therebetween, the rotor rotating a shaft; a sleeve supporting the shaft; and a sleeve housing having a mounting surface to support the core and a protrusion protruding from the mounting surface to prevent a rotation of the core.

The sleeve housing may be formed integrally with a base plate supporting the stator.

The sleeve housing and the base plate may each have a plate-like shape.

The protrusion may include a plurality of protrusions provided on the mounting surface.

A recess may be formed in the core so that the protrusion is received within the recess.

According to another aspect of the present invention, there is provided a method of manufacturing a motor device, the method including: arranging a plate having a plate-like shape under a press jig; and forming a mounting surface to support a core and a protrusion protruding from the mounting surface at the same time by pressing the plate down.

The forming of the protrusion may include forming a plurality of protrusions on the mounting surface.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
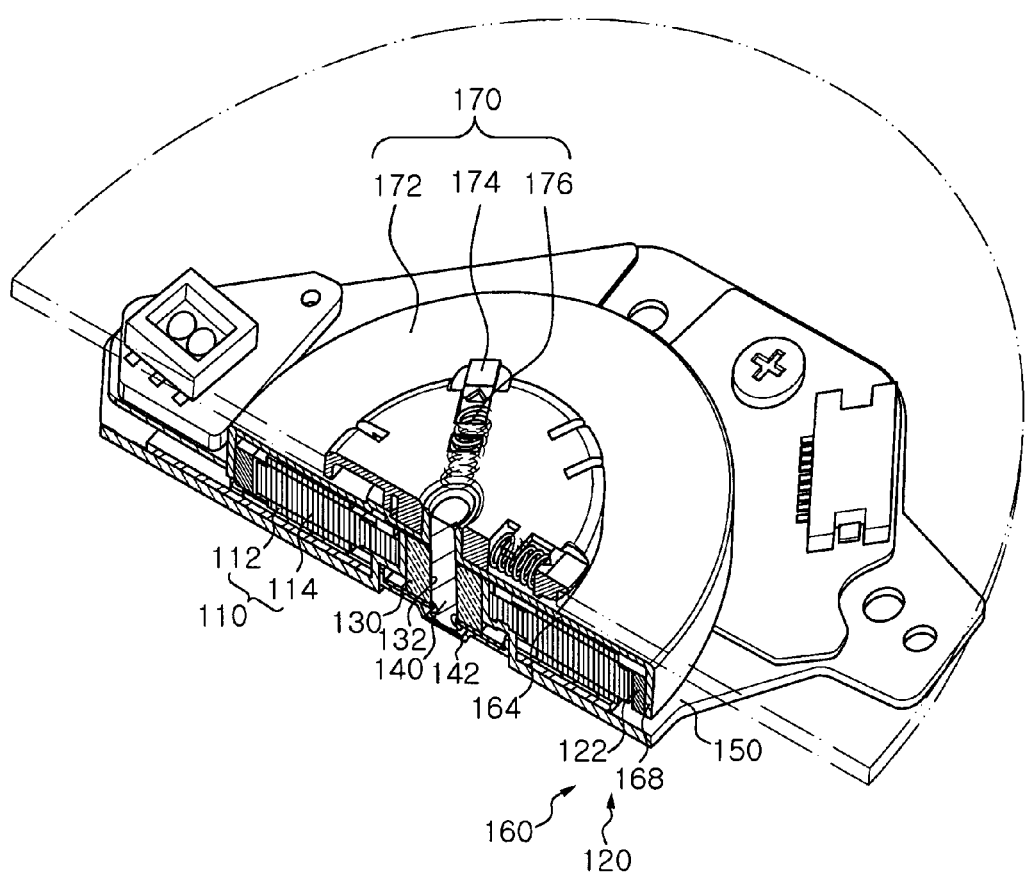
FIG. 1 is a partially cut-away perspective view illustrating a motor device according to an exemplary embodiment of the present invention.

A motor device and a method of manufacturing the same will be described in more detail with reference to FIGS. 1 through 6. Exemplary embodiments of the present invention will now be described in detail with reference to the accompanying drawings.

The invention may, however, be embodied in many different forms and should not be construed as being limited to the embodiments set forth herein. While those skilled in the art could readily devise many other varied embodiments that incorporate the teachings of the present invention through the addition, modification or deletion of elements, such embodiments may fall within the scope of the present invention.

In the drawings, the same or like reference numerals will be used throughout to designate the same or like components.

Figure 2:
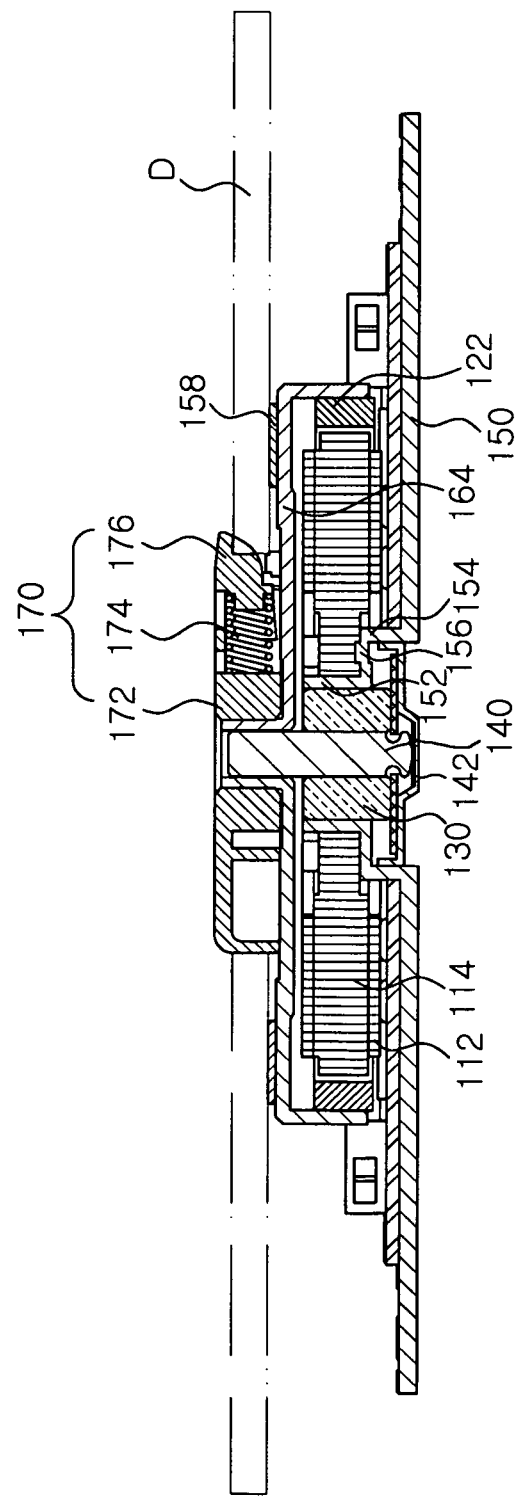
FIG. 2 is a cross-sectional view illustrating a motor device according to an exemplary embodiment of the present invention.

FIG. 1 is a partially cut-away perspective view illustrating a motor device according to an exemplary embodiment of the invention. FIG. 2 is a cross-sectional view illustrating a motor device according to an exemplary embodiment of the invention.

Referring to FIGS. 1 and 2, a motor device 100 may include a stator 110, a rotor 120, a sleeve 130, and a base plate 150.

The stator 110 is a stationary part that has winding coils 112 generating an electromagnetic force having a predetermined magnitude when power is applied thereto, and a plurality of cores 114 around which the winding coils 114 are wound in a radial manner on the basis of at least one pole.

The rotor 120 is a rotating part which is rotatable relative to the stator 110. Further, the rotor 120 has a rotor case 160, which is shaped like a cup and has a magnet 122 with an annular shape formed along an outer circumferential surface thereof. The magnet 122 corresponds to the cores 114 at a predetermined interval therebetween. The magnet 122 may be a permanent magnet having magnetic north and south poles magnetized alternately in the circumferential direction to thereby generate a magnetic force having a predetermined magnitude.

As shown in FIG. 1, the sleeve 130 may be assembled in such a manner that a lower body of the sleeve 130 is pressed and inserted into a sleeve housing 152 of the base plate 150. Here, the sleeve 130 may refer to a rotation support member that corresponds to the rotor 120 at a predetermined interval therebetween to produce a sliding surface therebetween.

A shaft hole 132 may be formed in the sleeve 130 so that the shaft 140 is bound to the sleeve 130 through the shaft hole 132. A plurality of radial dynamic pressure recesses may be formed into the shaft hole 132.

The shaft 140 is inserted into the shaft hole 132 of the sleeve 130 so that the shaft 140 rotates together with the rotor case 160. The rotor case 160 is mounted on the upper surface of the shaft 140.

Here, the shaft 140 may extend in the direction of the axis of rotation, and a thrust plate 142 is formed on a bottom surface of the shaft 140 to thereby reduce a frictional force relative to the shaft 140 during rotation.

The base plate 150 may have a cavity therein such that the shaft 140 and the sleeve 130 are pressed and inserted in the cavity. Further, the base plate 150 may have a mounting surface 154 such that the cores 114 are mounted on an upper side thereof.

A protrusion 156 protrudes upwardly from the mounting surface 154. The protrusion 156 is located between the cores 114 to thereby prevent the cores 114 from rotating due to electromagnetic force.

Figure 3:
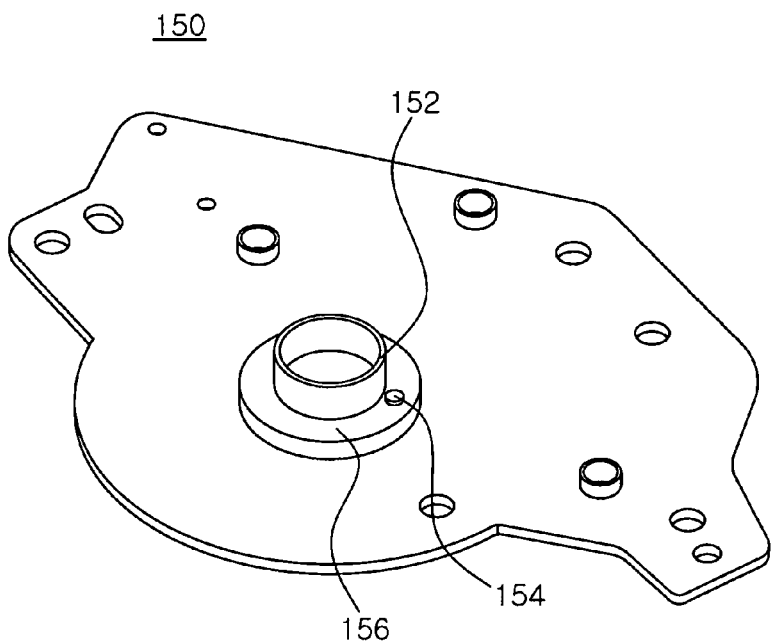
FIG. 3 is a perspective view illustrating a base plate according to an exemplary embodiment of the present invention.
Figure 4:
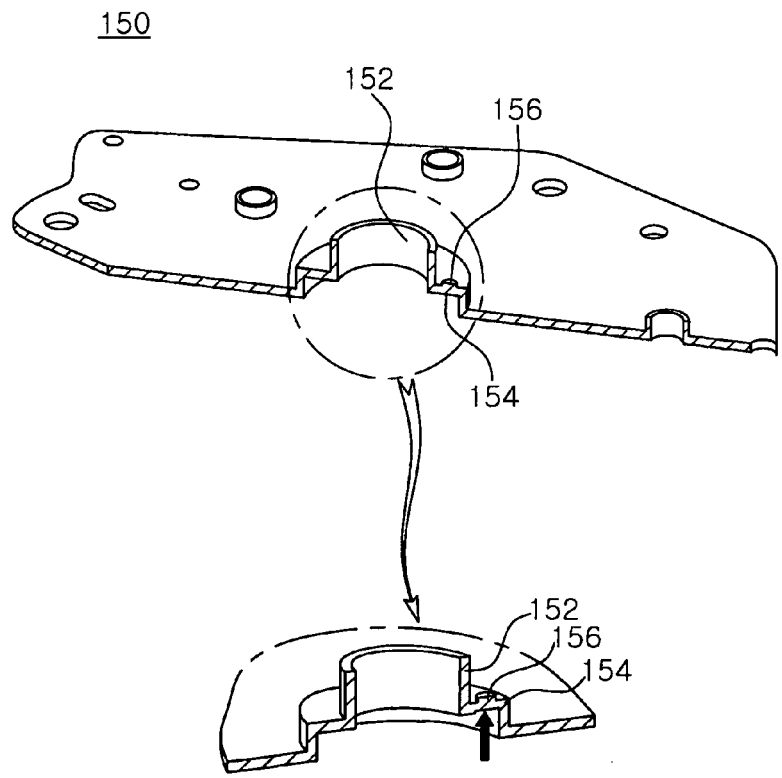
FIG. 4 is a partially sectional perspective view illustrating the base plate of FIG. 3.

FIG. 3 is a perspective view illustrating a base plate according to an exemplary embodiment of the invention. FIG. 4 is a partially sectional perspective view illustrating the base plate of FIG. 4.

Referring to FIGS. 3 and 4, the base plate 150 may be composed of a piece of metal plate that is formed integrally with the sleeve housing 152 formed by pressing such that the sleeve housing 152 protrudes on the basis of the cavity in which the shaft 140 and the sleeve 130 are received. Here, the protrusion 156 is pressed at the same time as the mounting surface 154 is compressed, so that the sleeve housing 152 is formed integrally with the base plate 150 (in the direction of the arrow depicted in FIG. 4).

Therefore, since the base plate 150 is manufactured using a piece of metal plate, it is easy to form the base plate 150. Furthermore, the sleeve housing 152 is formed integrally with the base plate 150 without using a separate holder, thereby reducing the number of components thereof.

Here, the number of protrusions 156 is not limited to one, and a plurality of protrusions may be provided according to the designers' intentions.

Hereinafter, the components, illustrated in FIGS. 1 and 2, will be described in more detail.

The rotor case 160 may include a hub 162, a horizontal portion 164, and a vertical portion 166. The hub 162 comes into contact with and extends along the side surface of the shaft 140. The horizontal portion 164 is formed integrally with the hub 162 while a disk D is mounted on the horizontal portion 164. The vertical portion 166 is bent perpendicularly downward from the horizontal portion 164.

Here, the horizontal portion 164 forming an upper surface of the rotor case 160 may be level to thereby prevent the disk D from being inclined when the disk D is mounted. A buffer portion 158 may be formed on the horizontal portion 164 such that the buffer portion 158 comes into contact with a bottom surface of the disk D. The buffer portion 158 may be formed of rubber.

Therefore, the motor device according to this embodiment is engaged with the shaft 140 and rotates together with the shaft 140, and also includes the rotor case 160 to support a disk to be mounted thereon. Thus, as compared with a structure having a holder assembled to a shaft and a case mounted on the holder, the motor device according to this embodiment can achieve further reduction in the thickness thereof.

Furthermore, a disk chucking device 170 may include a chuck housing 172, springs 174, and chuck chips formed of chip members 176.

The chuck housing 172 is mounted on the upper side of the rotor case 160. The chuck housing 172 may have a receiving space therein such that the chip members 176 are received therein while being exposed to the outside. Therefore, openings are formed in the receiving space so that the chip members 176 are mounted while being partially exposed to the outside.

The springs 174 are received in the chuck housing 172 such that one set of ends of the springs 174 come into contact with the chip members 176. When the chip members 176 are moved inwards by the disk, the elastic force exerted by the springs 171 is applied so that the chip members 176 return to their original positions.

The chip members 176 are mounted on the chuck housing 172 such that one set of ends of the chip members 176, located inside the chuck housing 172, are exposed to the outside. When the disk is mounted, the chip members 176 come into contact with a hole in the disk and are pushed into the inside of the chuck housing 172. Once the disk is located at its mounting position, the chip members 176 return to their original positions by the springs 174 to thereby secure the disk.

Figure 5:
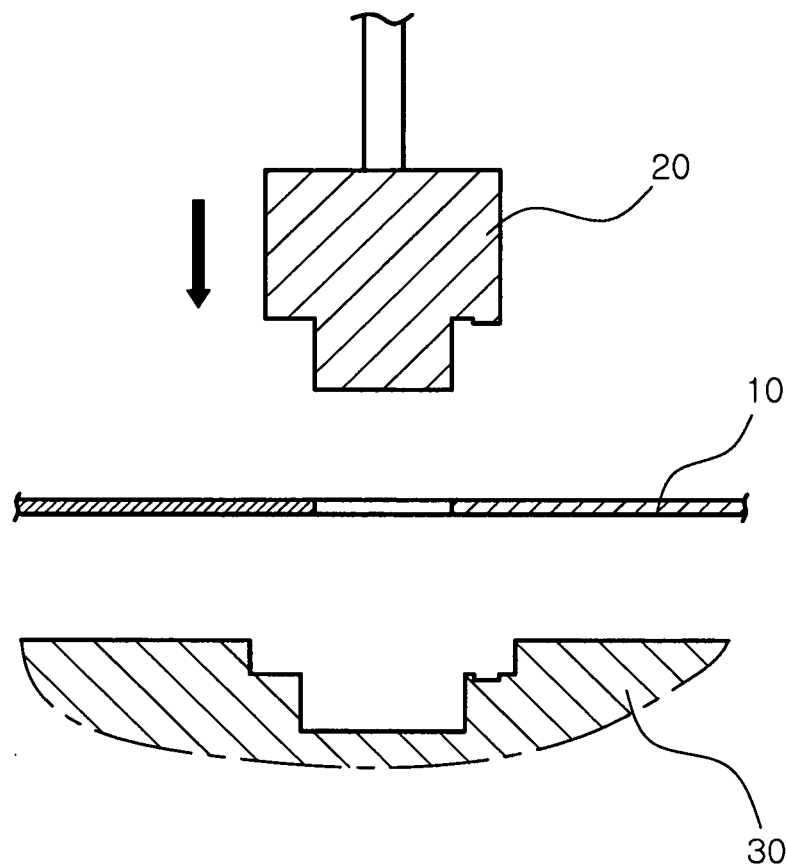
FIGS. 5 and 6 are cross-sectional views illustrating a method of manufacturing a base plate of a motor device according to an exemplary embodiment of the present invention.
Figure 6:
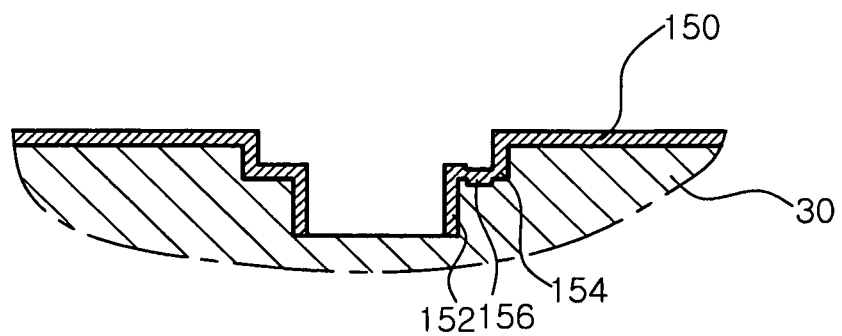

FIGS. 5 and 6 are cross-sectional views illustrating a method of manufacturing a base plate of a motor device according to an exemplary embodiment of the invention.

Referring to FIGS. 5 and 6, first, according to a method of manufacturing a motor device, a plate 10 having a plate-like shape is disposed under a press jig 20.

Here, the press jig 20 presses the plate 10 downwards on the basis of a hole in the plate 10. Further, the press jig 20 may have an outer surface being bent so that the mounting surface 154 and the protrusion 156 are simultaneously formed on the plate 10. However, the shape of the press jig 20 is not limited thereto, and the press jig 20 may be formed in various shapes according to the designers' intentions.

In this embodiment, according to the manufacturing method, the plate 10 may be pressed down to form the mounting surface 154 in order to support cores and the protrusion 156 protruding from the mounting surface 154 at the same time.

Here, a base jig 30 is located at a corresponding position to the press jig 20, and the base jig 30 is bent according to the shape of the press jig 20 so that the base jig 30 comes into tight contact with the press jig 20.

When the press jig 20 is moved (in the direction of the arrow) so that the press jig 20 and the base jig 30 come into close contact with each other, the mounting surface 154 and the protrusion 156 are formed on the plate 10, and the sleeve housing 152 is formed integrally with the plate 10.

Here, a plurality of protrusions 156 may be formed in the mounting surface 154. In the case that the press jig 20 has a shape corresponding to the plurality of protrusions, it is easy to realize the mounting surface 154 with the plurality of protrusions.

Therefore, since the base plate 150 is formed of a piece of metal plate, it is easy to manufacture the base plate 150 by using a one-time pressing process. Plus, the sleeve housing 152 is formed integrally with the base plate 150 to thereby reduce the number of components, so that economic efficiency is realized.

Figure 7:
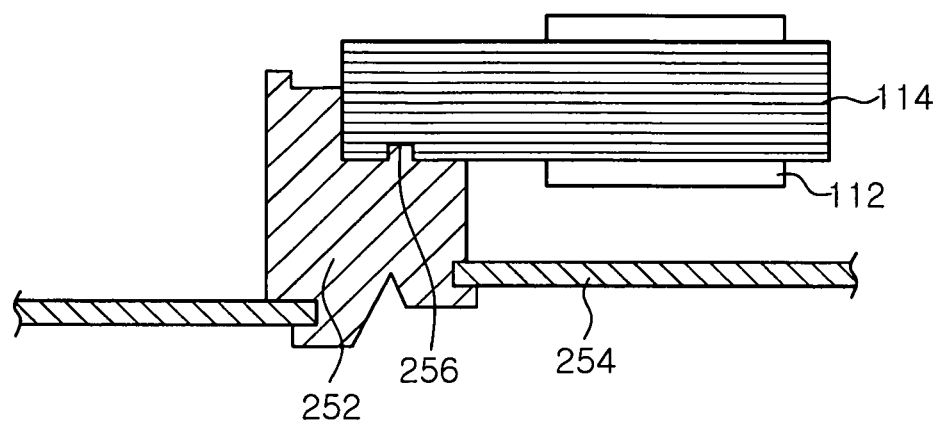
FIG. 7 is a partially cross-sectional view illustrating a sleeve housing and a base plate of a motor device according to another exemplary embodiment of the present invention.

FIG. 7 is a partially sectional view illustrating a sleeve housing and a base plate of a motor device according to another exemplary embodiment of the invention.

Referring to FIG. 7, a sleeve housing 252 and a base plate 254 may be formed separately, and a base plate 254 is mounted on a lower surface of the sleeve housing 252.

Here, the sleeve housing 252 has a mounting portion so that the cores 114 are mounted thereon. A protrusion 256 may protrude upwardly from the mounting portion so that the protrusion 256 is inserted into the core 114.

A recess is formed in the core 114 so that the protrusion 256 is received within the recess.

Therefore, the motor device according to this embodiment includes the sleeve housing 252 having the mounting portion in order to support the core 114 and the protrusion 256 in order to the rotation of the core 114, so that the protrusion 256 prevents the rotation of the core 114 to thereby increase the rotation resistance of the core 114.

As set forth above, according to exemplary embodiments of the invention, according to a motor device and a method of manufacturing the same provides a sleeve housing having a mounting surface in order to support a core and a protrusion in order to prevent the rotation of the core, so that the protrusion prevents the rotation of the core to thereby increase the rotation resistance of the core.

While the present invention has been shown and described in connection with the exemplary embodiments, it will be apparent to those skilled in the art that modifications and variations can be made without departing from the spirit and scope of the invention as defined by the appended claims.

What is claimed is:

1. A motor device comprising:
   a stator including a core having a coil wound thereround;
   a rotor having a magnet facing the core to thereby generate an electromagnetic force involved in interactions therebetween, the rotor rotating a shaft;
   a sleeve supporting the shaft; and
   a sleeve housing having a mounting surface to support the core and a protrusion protruding from the mounting surface to prevent a rotation of the core, the protrusion being formed monolithically with the sleeve housing, wherein
   the sleeve housing is formed monolithically with a base plate supporting the stator; and
   the protrusion, the sleeve housing, and the base plate are formed by pressing a single plate having a plate-like shape downwardly.

2. The motor device of claim 1, wherein the protrusion comprises a plurality of protrusions provided on the mounting surface.

3. The motor device of claim 1, wherein a recess is formed in the core so that the protrusion is received within the recess.

* * * * *